(12) United States Patent
Pattar et al.

(10) Patent No.: US 11,750,590 B2
(45) Date of Patent: *Sep. 5, 2023

(54) SINGLE SIGN-ON (SSO) USER TECHNIQUES USING CLIENT SIDE ENCRYPTION AND DECRYPTION

(71) Applicant: Oracle International Corporation, Redwood Shores, CA (US)

(72) Inventors: Nagaraj Pattar, Gulbarga (IN); Pruthvithej Ramesh Kumar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/666,508

(22) Filed: Feb. 7, 2022

(65) Prior Publication Data
US 2022/0166765 A1    May 26, 2022

Related U.S. Application Data

(63) Continuation of application No. 16/789,874, filed on Feb. 13, 2020, now Pat. No. 11,283,789.

(51) Int. Cl.
    *G06F 7/04*     (2006.01)
    *H04L 9/40*     (2022.01)

(52) U.S. Cl.
    CPC ...... *H04L 63/0815* (2013.01); *H04L 63/0435* (2013.01); *H04L 63/0876* (2013.01); *H04L 63/20* (2013.01)

(58) Field of Classification Search
    CPC . H04L 63/0815; H04L 63/0435; H04L 63/20; H04L 63/0876; H04L 63/0442;
    (Continued)

(56) References Cited

U.S. PATENT DOCUMENTS 9,247,006 B2    1/2016  Mathew et al.
9,866,640 B2    1/2018  Motukuru et al.
(Continued)

OTHER PUBLICATIONS

Thakur et al. User Identity and Access Management Trends in IT Infrastructure—An Overview, Jan. 1, 2015, IEEE, pp. 1-4. (Year: 2015).*

(Continued)

*Primary Examiner* — Philip J Chea
*Assistant Examiner* — Jenise E Jackson
(74) *Attorney, Agent, or Firm* — Kilpatrick Townsend & Stockton LLP

(57) ABSTRACT

An access management system (AMS) is disclosed that includes SSO capabilities for providing users secure access to protected resources within an enterprise using encryption keys generated by a client application. The AMS receives a request from a client application for a user to access a protected resource. In certain examples, the request comprises a client application identifier, a session identifier and a client public encryption key. The AMS determines if the session identifier points to a valid session and upon determining that the session identifier corresponds to a valid session, transmits information associated with the valid session to the client application. In certain examples, the information associated with the valid session is encrypted using the client public encryption key. Based on information associated with the valid session received from the client application, the AMS determines whether to grant or deny a user access to a protected resource within the enterprise.

14 Claims, 8 Drawing Sheets

(58) Field of Classification Search
CPC ..... H04L 63/10; H04L 9/0819; H04L 9/0816;
H04L 9/0825; G06F 21/31; G06F 21/41;
G06F 21/73
See application file for complete search history.

(56) References Cited

U.S. PATENT DOCUMENTS

| | | | |
|---|---|---|---|
| 11,283,789 | B2 | 3/2022 | Pattar et al. |
| 2005/0273592 | A1* | 12/2005 | Pryor .................... H04L 63/123 713/150 |
| 2017/0201520 | A1* | 7/2017 | Chandoor ............. H04W 12/35 |
| 2017/0208461 | A1* | 7/2017 | Yin ..................... H04L 12/1403 |
| 2018/0077243 | A1 | 3/2018 | Mathew et al. |
| 2018/0255456 | A1* | 9/2018 | Yin ..................... H04W 12/041 |
| 2019/0199522 | A1* | 6/2019 | Liao ..................... H04L 9/0894 |

OTHER PUBLICATIONS

Bhargavan et al, Cryptographic Protocol Synthesis and Verification for Multiparty Sessions, Jul. 10, 2009, IEEE, pp. 124-140. (Year: 2009).*
U.S. Appl. No. 16/789,874, Notice of Allowance dated Nov. 19, 2021, 23 pages.
Bhargavan et al., "Cryptographic Protocol Synthesis and Verification for Multiparty Sessions", 2009 22nd IEEE Computer Security Foundations Symposium, Jul. 8, 2019, pp. 124-140.
Thakur et al., "User Identity and Access Management Trends in IT Infrastructure—An Overview", IEEE, 2015 International Conference on Pervasive Computing (ICPC), Apr. 16, 2015, pp. 1-4.

* cited by examiner

SINGLE SIGN-ON (SSO) USER TECHNIQUES USING CLIENT SIDE ENCRYPTION AND DECRYPTION

CROSS-REFERENCE TO RELATED APPLICATION

The present application is a continuation of, and claims the benefit of and priority to, U.S. patent application Ser. No. 16/789,874, filed on Feb. 13, 2020, the entire contents of which are incorporated herein by reference for all purposes.

TECHNICAL FIELD

This disclosure relates generally to access management systems. More specifically, but not by way of limitation, this disclosure describes an access management system that includes single sign-on (SSO) capabilities for providing users with secure access to protected resources within an enterprise using encryption keys generated by a client application.

BACKGROUND

An access management system enables users to access one or more different systems and applications within an enterprise. Each of these systems and applications may utilize different access control policies and request different credentials (e.g., user names and passwords). A user wanting to access a resource protected by an access management system may need to be authenticated by providing credentials to the access management system. A successful authentication gives the user authorization to access the protected resource, based on the user's access privileges. In certain instances, a user may request access to multiple protected resources within the enterprise. In such instances, upon successful user authentication, the access management system may establish a single sign-on session (SSO) for the user. Using the SSO session, the user is able to access multiple resources after initial authentication without the need to be re-authenticated each time the user requests access to a protected resource.

Existing access management systems typically rely on cookies for maintaining a user's session by storing the user's session information as a cookie on the user's device. After successful user authentication, session state information associated with the user's session is encrypted and stored in a cookie on the user's device. When the user (e.g., via a client application) connects to the access management system to gain access to a resource protected by the access management system, the cookie information is exchanged with the access management system to verify the validity of the user's session. If the user's session is valid, the access management system provides the user with SSO access to the protected resource using session information stored in the cookie without re-authenticating the user. However, the use of cookies in client applications (e.g., web browsers) can pose security or privacy concerns for an enterprise since the information stored by these cookies can be accessed by third party applications visited by the user. In many instances, the enterprise may disable or block cookies on their client applications to respond to such security or privacy considerations. However, this causes problems for web applications that require information about a user's session to provide the user access to protected resources within an enterprise.

SUMMARY

This disclosure relates generally to access management systems. More specifically, but not by way of limitation, this disclosure describes an access management system that includes SSO capabilities for providing users with secure access to protected resources within an enterprise using encryption keys generated by a client application.

In certain embodiments, an access management system is disclosed. The access management system receives a request from a client application requesting access by a user to a protected resource. In certain examples, the request comprises a client application identifier identifying the client application, a client public encryption key and a session identifier. The access management system determines, based on information stored in a data store, that the client application identifier is associated with the session identifier identifying a valid session for the user. Based on the determining, the access management system obtains an encrypted session identifier stored in the data store associated with the client application identifier. In certain examples, the encrypted session identifier is generated by the access management system by encrypting the session identifier using the client public encryption key.

In certain embodiments, the access management system transmits the encrypted session identifier to the client application and responsive to the transmitting, receives, from the client application, a response from the client application. In certain examples, the response includes information related to the valid session. In certain embodiments, the access management system determines a second session identifier from the response received from the client application and determines that the second session identifier matches the session identifier associated with the client application identifier stored in the data store. In certain embodiments, upon determining that the second session identifier matches the session identifier associated with the client application identifier stored in the data store, the access management system enables the user to access the protected resource. In certain embodiments, upon determining that the second session identifier does not match the session identifier associated with the client application identifier stored in the data store, the access management system denies the user access to the protected resource.

In certain examples, the second session identifier comprises a decrypted session identifier generated by the client application by decrypting the encrypted session identifier received from the computer system using a client private encryption key generated by the client application. In certain examples, the second session identifier comprises a second encrypted session identifier. The second encrypted session identifier is generated by the client application by decrypting the encrypted session identifier received from the computer system using a client private encryption key generated by client application and encrypting the decrypted session identifier using a public encryption key associated with the computer system to generate the second encrypted session identifier.

In certain embodiments, the access management system decrypts the second encrypted session identifier using a private encryption key associated with the access management system to generate a decrypted second session identifier, determines that the decrypted second session identifier matches the session identifier associated with the client application identifier stored in the data store and based on the determining enables the user to access the protected resource.

In certain embodiments, the access management system decrypts the second encrypted session identifier using a private encryption key associated with the access management system to generate a decrypted second session identifier, determines that the decrypted second session identifier does not match the session identifier associated with the client application identifier stored in the data store and based on the determining denies the user access to the protected resource.

In certain embodiments, the access management system performs an authentication of the user to access the protected resource. In certain examples, the authentication is performed in response to receiving an initial request from the client application prior to the request and based on determining, by the access management system that the session identifier for the client application identifier specified in the initial request is not valid. Based upon successful authentication, the access management system establishes a session for the user and enables the user to access the protected resource.

In certain embodiments, the authentication performed by the access management system comprises transmitting a credential information request to the client application, receiving credential information associated with the user from the client application, validating the credential information against stored credential information associated with the user and based on the validating, performing authentication of the user.

In certain embodiments, establishing a session for the user by the access management system comprises associating a session identifier with the session, encrypting the session identifier with the client public encryption key to generated the encrypted session identifier and associating the client application identifier to the session identifier, the encrypted session identifier and session data associated with the session. In certain embodiments, the access management system stores the client application identifier, the session identifier, the encrypted session identifier and the session data associated with the session in the data store.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
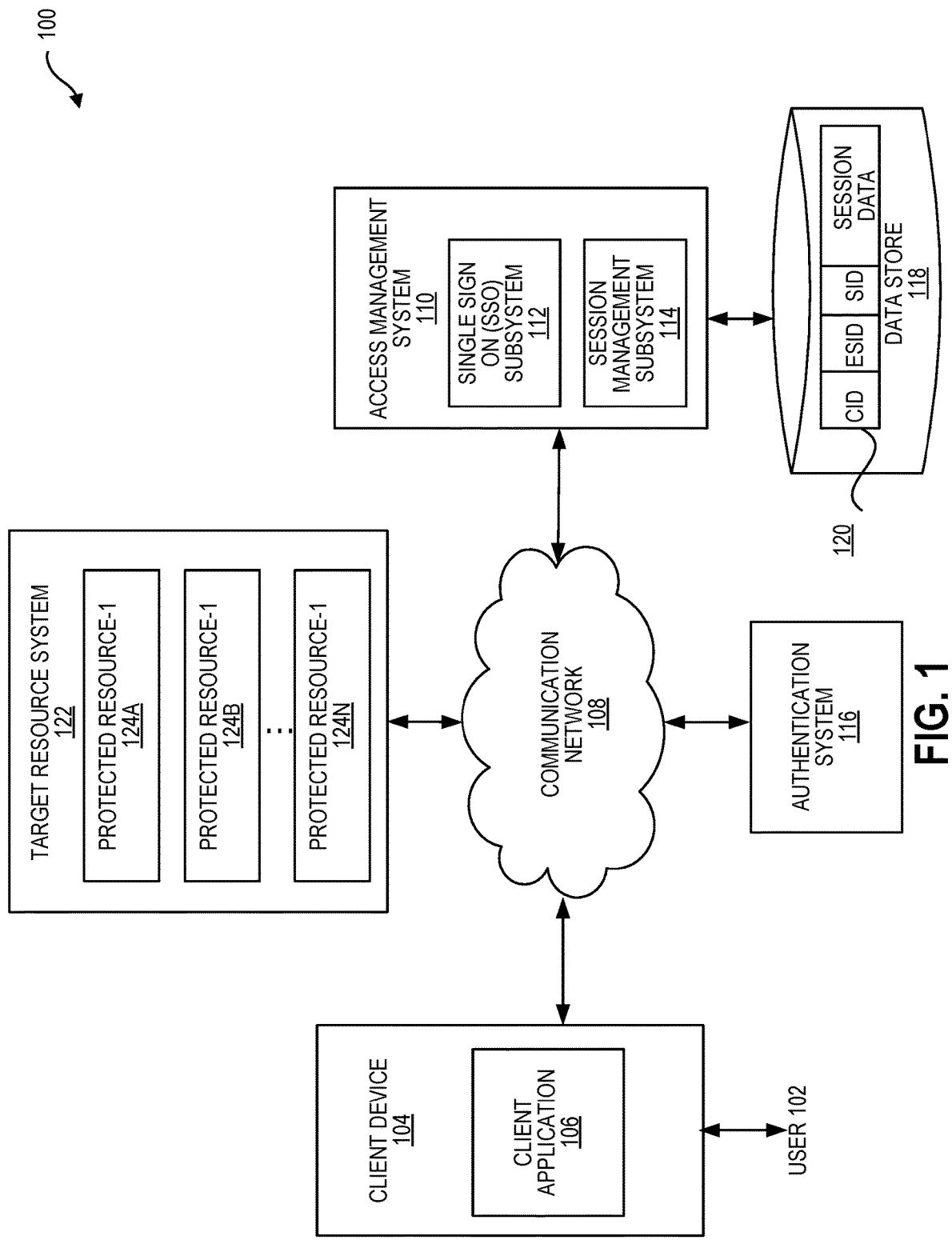
FIG. 1 depicts a simplified diagram of a computing environment that includes an access management system that includes capabilities for providing secure access to protected resources within the computing environment, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes improved techniques for performing access control using an access management system to enable a user to access multiple protected resources within an enterprise using encryption keys generated by a client application. As indicated in the Background section, conventional approaches for performing access control typically rely on the use of cookies in client applications to enable a user to access multiple protected resources within an enterprise. However, as noted above, since the information stored in cookies can potentially be exposed to third party applications visited by the user, the use of cookies in client applications can result in security risks for the enterprise. Some approaches avoid the use of cookies by exchanging digital certificates between the client application and the access management system to enable a user to access multiple protected resources within the enterprise. However, the use of digital certificates still requires the user to install the digital certificate on the client application and requires the validation of the digital certificate by the access management system for each user request. Other approaches involve passing a session identifier associated with the user's session as part of a Universal Resource Locator (URL) parameter instead of storing the session information as a value stored in a cookie. However, this approach can also lead to security risks for the enterprise because the URL parameter is typically stored in browser history and server logs which can be accidentally exposed by users when the users access third party applications.

The various embodiments described in the present disclosure address the deficiencies of the above approaches by disclosing an access management system (AMS) that includes SSO capabilities for providing users with secure access to protected resources within an enterprise using encryption keys generated by a client application. In certain embodiments, when a user (e.g., via a client application) connects to an access management system to gain access to a resource protected by the access management system, the client application transmits a client application identifier and a client public encryption key as part of the request. Upon receiving the request, the AMS determines if there is a session identifier associated with the client application identifier in the request and further determines if the session identifier points to a valid session. If the AMS determines that there is no session identifier associated with the client application identifier received in the request or that the session identifier does not point to a valid session, the AMS attempts to authenticate the user requesting access to the protected resource. Upon successful user authentication, the access management system establishes a session for the user and provides the user access to the protected resource. As part of establishing a session, the AMS encrypts a session identifier associated with the session using the client public encryption key transmitted as part of the request by the client application. The AMS stores session information about the user's session for the client application identifier specified in the request. In certain examples, the session information may include the session identifier, the encrypted session identifier and session data associated with the user session.

If the AMS determines that there is a session identifier associated with the client application identifier received in the request and that the session identifier points to an active and valid session, the AMS performs SSO authentication to enable the user access to the protected resource using the encryption keys generated by the client application without requiring the user to enter credential information. As part of performing SSO authentication, the AMS presents the encrypted session identifier stored in the data store that is associated with the client application identifier to the client application. The client application decrypts the encrypted session identifier using its private encryption key. In certain embodiments, the AMS receives a decrypted session identifier from the client application and determines if the decrypted session identifier received from the client application matches the session identifier associated with the client identifier stored in the data store. If a match is found, the AMS grants access to the additional protected resources requested by the user. If a match is not found, the AMS denies access to the additional protected resources requested by the user.

The disclosed approach facilitates SSO authentication without requiring the use of specific digital certificates or cookies to be stored on the client application to enable a user access to multiple protected resources within an enterprise. Since a user's session information is stored on the server (i.e., the access management system) and the client application has the capability to encrypt/decrypt session information sent to it by the access management system, cookie information does not need to be stored on the client application or exchanged with the access management system to enable the user access to the protected resources. This results in providing increased security to services that require storing information about a user's session to provide the user access to multiple protected resources within the enterprise. Additionally, since session information is stored on the server, this information can safely be shared between web sites in different domains without posing a security threat to the enterprise. Typically, client applications (e.g., web browsers) that store session information in cookies do not allow sharing of cookies between web sites in different administrative domains due to security reasons. However, as web applications get richer, data sharing across domain boundaries becomes increasingly important.

Referring now to the drawings, FIG. 1 depicts a simplified diagram of a computing environment 100 that includes an access management system (AMS) that includes capabilities for providing secure access to protected resources within the computing environment, according to certain embodiments. In certain embodiments, AMS 110 includes capabilities for providing Single Sign On (SSO) authentication for users accessing the protected resources. As used herein, SSO authentication refers to a session and user authentication service provided by AMS 110 that permits a user to use one set of login credentials (e.g., a username and password) to gain access to multiple resources managed and/or protected by AMS 110, without the user having to re-enter log-in credentials each time to gain access to the individual protected resources. In certain examples, the protected resources may include applications, documents, files, web pages, web content, computing resources and so on within computing environment 100. As shown in the embodiment depicted in FIG. 1, in certain examples, protected resources (e.g., 124A-124N) may be provided by and/or stored in a target resource system 122 (e.g., a resource server) within computing environment 100. Target resource system 122 may be implemented by one or more computing systems that execute computer-readable instructions (e.g., code, program) to implement target resource system 122.

Access management system (AMS) 110 may be implemented by one or more computing systems that execute computer-readable instructions (e.g., code, program) to implement AMS 110. As depicted in FIG. 1, AMS 110 includes various subsystems including a Single Sign On (SSO) subsystem 112 and a session management subsystem 114. Portions of data or information used by or generated by AMS 110 as part of its processing may be stored in a persistent memory such as data store 118 that is communicatively coupled to AMS 110 possibly via one or more communication networks 108. For instance, data store 118 may store information related to SSO sessions established by AMS 110 for users accessing the protected resources, user credential information related to the users and so on. The systems and subsystems depicted in FIG. 1 may be implemented using only software (e.g., code, instructions, program) executed by one or more processing units (e.g., processors, cores) of a computing system, hardware, or combinations thereof. The software may be stored on a non-transitory storage medium (e.g., on a memory device).

Computing environment 100 depicted in FIG. 1 is merely an example and is not intended to unduly limit the scope of claimed embodiments. One of ordinary skill in the art would recognize many possible variations, alternatives, and modifications. For example, in some implementations, AMS 110 can be implemented using more or fewer subsystems than those shown in FIG. 1, may combine two or more subsystems, or may have a different configuration or arrangement of subsystems.

As depicted in FIG. 1, a user 102 may request access to a protected resource (e.g., 124A) within computing environment 100 using a client application 106 executed by client device 104. Client device 104 may be of various types, including but not limited to, a mobile phone, a tablet, a desktop computer, and the like. For instance, user 102 may request access to a protected resource (e.g., a first application 124A) stored on target resource system 122 using a user interface (UI) (which may be a graphical user interface (GUI)) of client application 106 by entering a uniform resource locator (URL) or other data identifying the requested resource. In certain embodiments, AMS 110 is configured to intercept the request from client application 106, authenticate the user attempting to access the protected resource and upon successful authentication, create a session for the user and provide the user with access to the protected resource. In certain examples, in the same user session (i.e., while still being logged into the first application 124A), user 102 may attempt to access another protected resource (e.g., second application 124B) stored on target resource system 122. Since the second application is also protected by AMS 110, in certain embodiments, AMS 110 determines if the user is authorized to access the second application and if the second application is an SSO-enabled resource. As used herein, an SSO-enabled resource refers to a resource for which SSO processing can be enabled to provide the user access to the resource. If the user is authorized to access the second application and the second application is an SSO-enabled resource, AMS 110, upon determining that the user session is active and still valid, performs SSO authentication to enable the user access to the protected resource. In some instances, AMS 110 may maintain a single SSO session to provide the user access to multiple resources after authentication. In certain examples, the multiple resources may represent different applications as described above. In other examples, the multiple resources may represent different websites within the same application, different webpages from the same website and so on. In certain examples, and as will be discussed in detail below, AMS 110 may utilize encryption keys generated by client application 106 to perform SSO authentication and establish an SSO session for the user to provide the user access to the multiple resources. Details related to the processing performed by the various systems and subsystems of AMS 110 (e.g., SSO subsystem 112 and session management subsystem 114) are described below with respect to the figures depicted in FIGS. 2-5 below and their accompanying description.

Figure 2:
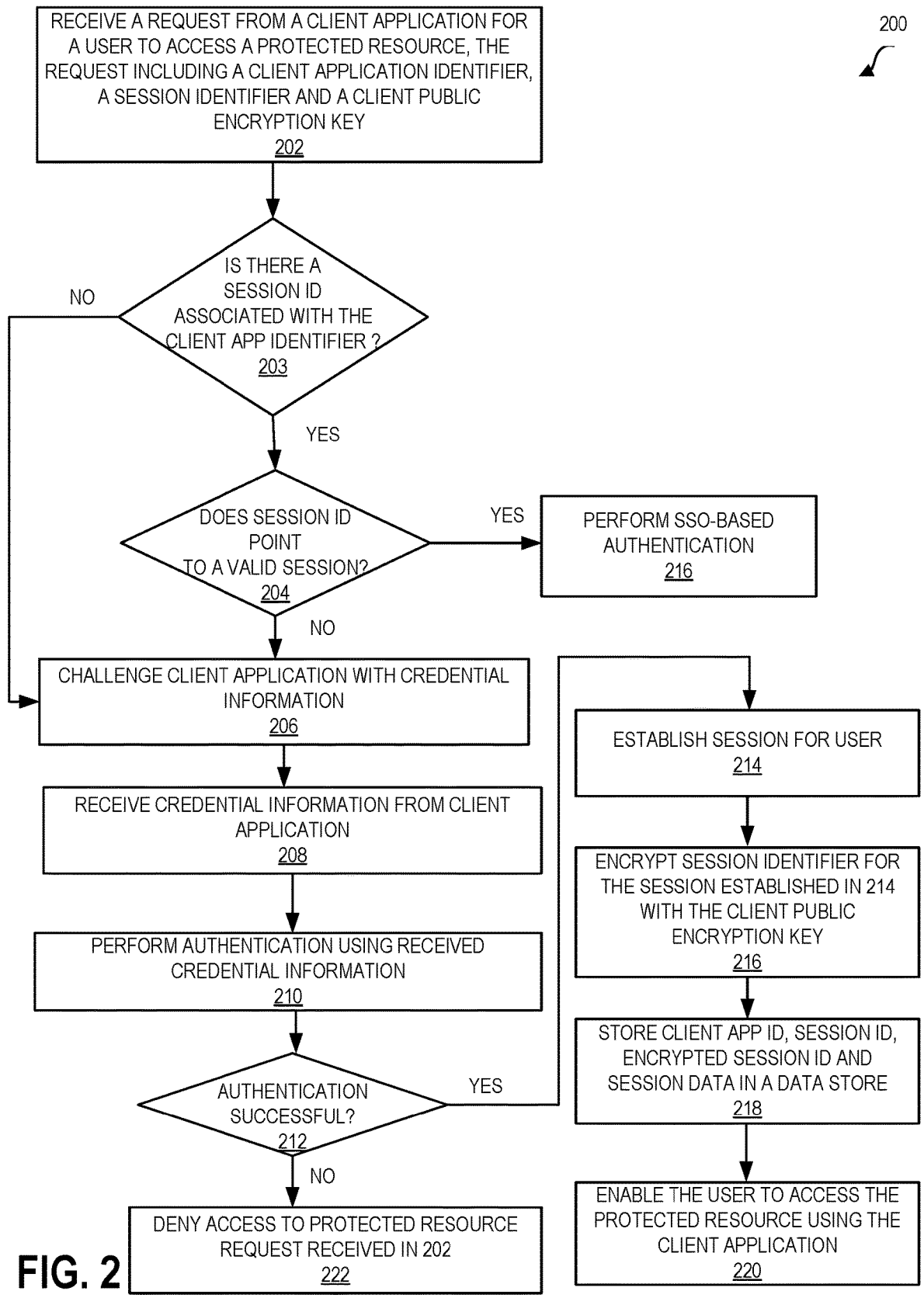
FIG. 2 depicts an example of a process performed by the AMS for enabling a user to access protected resources within the computing environment depicted in FIG. 1, according to certain embodiments.

FIG. 2 depicts an example of a process 200 performed by the access management system for enabling a user to access protected resources within the computing environment depicted in FIG. 1, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by AMS 110. In certain embodiments, within AMS 110, the processing in 202-220 in FIG. 2 may be performed by SSO subsystem 112 and session management subsystem 114 depicted in FIG. 1.

At block 202, processing is initiated when AMS 110 receives a request from client application 106 for a user 102 to access a protected resource (e.g., protected resource 124A) provided by or stored in target resource system 122 within computing environment 100. For example, as discussed in FIG. 1, user 102 may request access to a protected resource using a GUI of client application 106 by entering a uniform resource locator (URL) or other data identifying the requested resource. In certain embodiments, upon receiving the request, client application 106 generates a client application identifier (i.e., a unique identifier identifying the client application) and a set of encryption keys. The generation of a client application identifier by client application 106 may be specific to the type of implementation technique employed by client application 106 to generate the client application identifier. In certain examples, client application 106 may be configured to generate a single client application identifier and utilize the same client application identifier across multiple sessions established for the user. In other examples, client application 106 may be configured to generate a new client application identifier each time a session for the user is established. In one example, the set of encryption keys generated by client application 106 comprise a client public encryption key and a client private encryption key. Client application 106 may be configured to generate the set of encryption keys (i.e., the client public encryption key and the client private encryption key) using one of several encryption algorithms known in the art (for e.g., the Rivest-Shamir-Adleman (RSA) technique, the Elliptic Curve Cryptography (ECC) technique or any other asymmetric encryption technique).

In certain examples, the request (including the URL, the client application identifier, a session identifier and the client public encryption key) is then transmitted by client application 106 to AMS 110. For example, if client application 106 is a web browser executed by client device 104, the request comprising the URL, client application identifier, session identifier and the client public encryption key may be transmitted as part of a user agent field (e.g., as part of a user agent Hyper Text Transfer Protocol (HTTP) header) of the web browser to AMS 110.

At block 203, AMS 110 receives the request and determines if there is a session identifier associated with the client application identifier in the request received at block 202. If the request includes a session identifier, at block 204, AMS 110 determines if the session identifier points to a valid session. In certain embodiments, the processing at block 204 may be performed by session management subsystem 114 within AMS 110. In certain examples, as part of session management, the processing at block 204 may involve, determining, by session management system 114, if the session identifier corresponds to a valid (i.e., an active or unexpired) session established by AMS 110 by accessing sessions information 120 associated with the particular client application identifier from data store 118. In certain examples, sessions information 120 for a client application identifier may include, a session identifier, an encrypted session identifier, and session data associated with the session. As described herein, a session identifier is used to refer to a globally unique string that programmatically identifies a specific session established by AMS 110. In certain embodiments, the encrypted session identifier may be generated by AMS 110 using the client public encryption key of the client application. Details related to the generation of the encrypted session identifier is discussed in detail below. Session data may include information about the session such as session state information, session life cycle events, session expiration times and so on. In certain examples, data store 118 may be configured to store sessions information 120 comprising multiple sessions established for a user of the client application. In some examples, session management system 114 may be configured to associate the same client application identifier for each session established for a user. In other examples, session management system 114 may be configured to associate a different client application identifier for each session established for a user, which may be generated by client application 106 each time a new session for the user is established.

At block 204, if AMS 110 determines that the session identifier in the request points to an active and/or valid session, at block 216, AMS 110 determines if the resource specified in the request is a protected and SSO-enabled resource. If the resource is a protected and SSO-enabled resource, AMS 110 performs SSO-based authentication to enable the user access to the resource without prompting the user to re-enter credentials. Details related to the processing performed by AMS 110 for performing SSO authentication and establishing an SSO session are described below with respect to the figures depicted in FIGS. 4-5 below and their accompanying description.

If at block 203, AMS 110 determines that there is no session identifier associated with the client application identifier received in the request or at block 204, AMS 110 determines that the session identifier does not point to an active and/or valid session, AMS 110 attempts to authenticate the user requesting access to the protected resource. For instance, as part of the authentication process, at block 206, AMS 110 may transmit a credential information request in the form of a challenge to client application 106. In some examples, AMS 110 may redirect the credential information request to authentication system 116 (which may be communicatively coupled to AMS 110 possibly via one or more communication networks 108) which in turn may transmit the challenge to client application 106 to prompt the user for user credentials (e.g., a username and a password). The credential information request may include information (e.g., a URL) displayed via a UI (e.g., a web page, portal, or dashboard) of client application 106 to receive credential information from the user. For instance, the credential information request may cause client application 106 to display to the user, a login screen that enables the user to provide the credential information. Client application 106 then transmits the credential information to authentication subsystem 116. At block 208, AMS 110 receives the credential information from client application 106. At block 210, AMS 110 performs authentication using the received credential information. In some examples, AMS 110 may redirect the credential information to authentication system 116 which in turn may perform the authentication by validating the credential information of the user against user data stored in a user directory in data store 118.

At block 212, AMS 110 performs a check to determine if authentication was successful. Upon successful user authentication, at block 214, AMS 110 establishes a session for the user and associates the session with a session identifier. At block 216, AMS 110 encrypts the session identifier with the client public encryption key received in the request. At block 218, AMS 110 stores the client application identifier, the session identifier, the encrypted session identifier and the session data associated with the session and associates the client application identifier with the session identifier, the encrypted session identifier and the session data. In certain examples, the client application identifier, the session identifier, the encrypted session identifier and the session data associated with the session are stored as part of sessions information 120 in data store 118. At block 220, AMS 110 enables user 102 to access the protected resource (e.g., 124A) using client application 106.

If at block 212, AMS 110 determines that authentication was unsuccessful, then at block 222, AMS 110 denies the user access to the protected resource request received in block 202.

Figure 3:
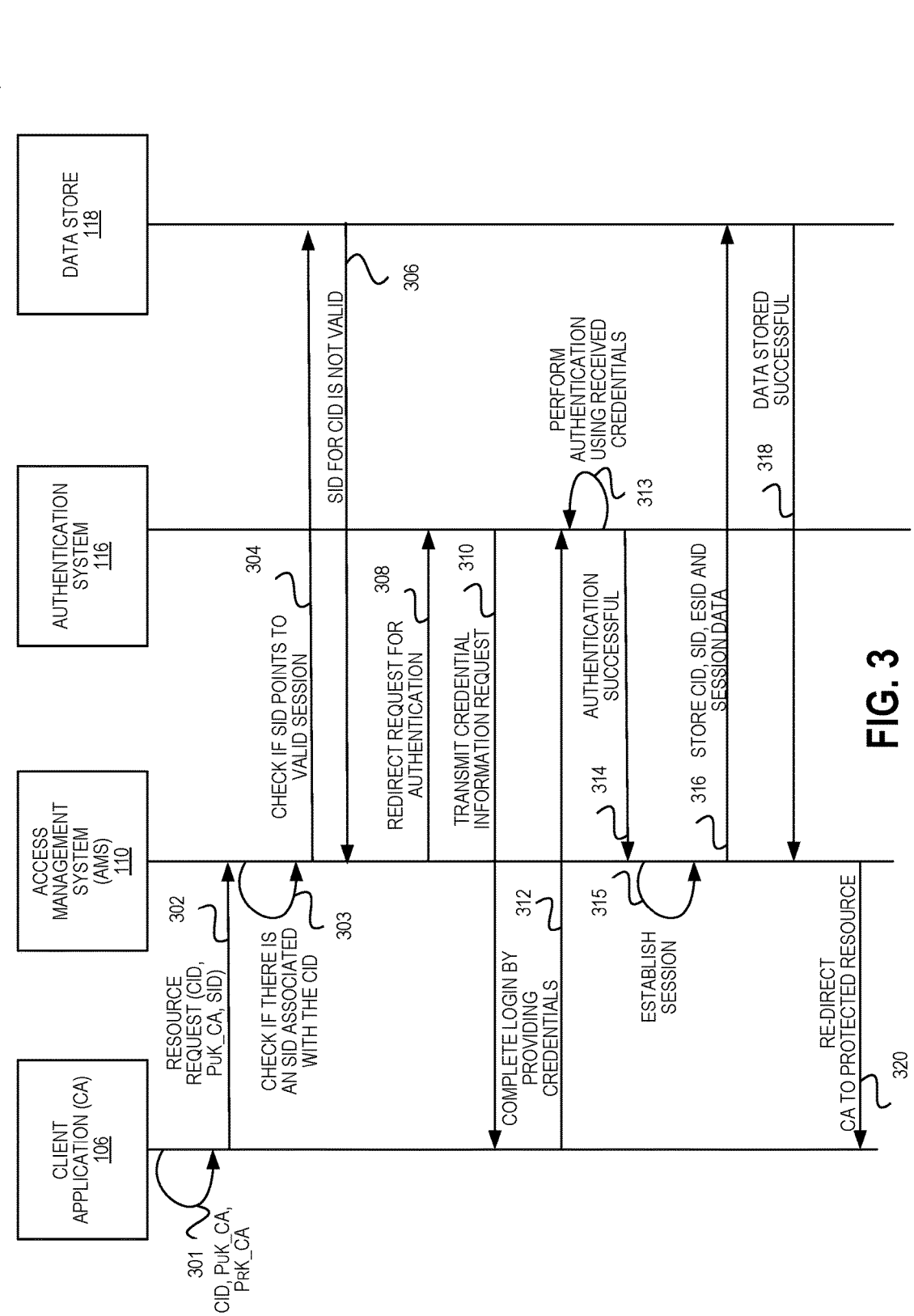
FIG. 3 is a sequence diagram illustrating the interactions between the various systems and subsystems shown in the computing environment of FIG. 1 for enabling a user to access a protected resource within computing environment, according to certain embodiments.

FIG. 3 is a sequence diagram illustrating the interactions between the various systems and subsystems shown in computing environment 100 of FIG. 1 for enabling a user to access a protected resource within computing environment, according to certain embodiments. The processing depicted in FIG. 3 is initiated when a user (e.g., 102) requests access to a protected resource (e.g., 124A) using a client application (e.g., 106) of a client device (e.g., 104) by entering a uniform resource locator (URL) or other data identifying the requested resource. Upon receiving the request, at operation 301, client application 106 generates a client application identifier and a set of encryption keys (i.e., a client public encryption key and a client private encryption key). For purposes of this disclosure the client private encryption key and the client public encryption key generated by client application 106 are referred to herein using the notations, PrK_CA and PuK_CA respectively. At operation 302, client application transmits the request (including the URL, the client application identifier, a session identifier and the client public encryption key) to AMS 110.

At operation 303, AMS 110 receives the request from client application 106 and determines if there is a session identifier associated with the client application identifier in the request. If the request includes a session identifier associated with the client application identifier, at operation 304, AMS 110 performs another check to determine if the session identifier points to an active and/or valid session by accessing sessions information 120 associated with the particular client application identifier from data store 118. If AMS determines that there is no session identifier associated with the client application identifier received in the request or that the session identifier does not point to an active and/or valid session stored in data store 118, AMS 110 attempts to authenticate the user requesting access to the protected resource. For instance, as noted above, as part of the authentication process, AMS 110 may transmit a credential information request in the form of a challenge to client application 106.

In certain examples, at operation 308, AMS 110 re-directs the credential information request to authentication system 116 which then attempts to authenticate the user requesting access to the protected resource. In certain examples, as part of the authentication process, at operation 310, authentication system 116 transmits the credential information request to client application 106. In certain examples, and as described in FIG. 2, the credential information request may cause client application 106 to display to the user, a login screen that enables the user to provide credential information (e.g., a username and a password). At operation 312, user 102 completes the login process by providing credentials and client application 106 transmits the credential information to authentication subsystem 116. At operation 313, authentication system 116 receives the credential information performs user authentication using the received credential information. In certain examples, authentication system 116 performs user authentication by validating the credential information of the user against user data stored in a user directory in data store 118. At operation 314, authentication system 116 transmits a message to AMS 110 that authentication is complete and successful.

At operation 315, AMS 110 establishes a session for the client application identifier specified in the request, associates the session with a session identifier and encrypts the session identifier using the client public encryption key specified in the request. At operation 316, AMS 110 stores the client application identifier, the session identifier, the encrypted session identifier and the session data associated with the session and associates the client application identifier with the session identifier, the encrypted session identifier and the session data. In certain examples, the client application identifier, the session identifier, the encrypted session identifier and the session data associated with the session are stored as part of sessions information 120 in data store 118. At 318, AMS 110 receives a message from data store 118 that sessions information associated with the client application identifier is successfully stored. At 320, AMS 110 enables user 102 to access the protected resource (e.g., 124A) using client application 106 by re-directing the client application to the protected resource.

Figure 4:
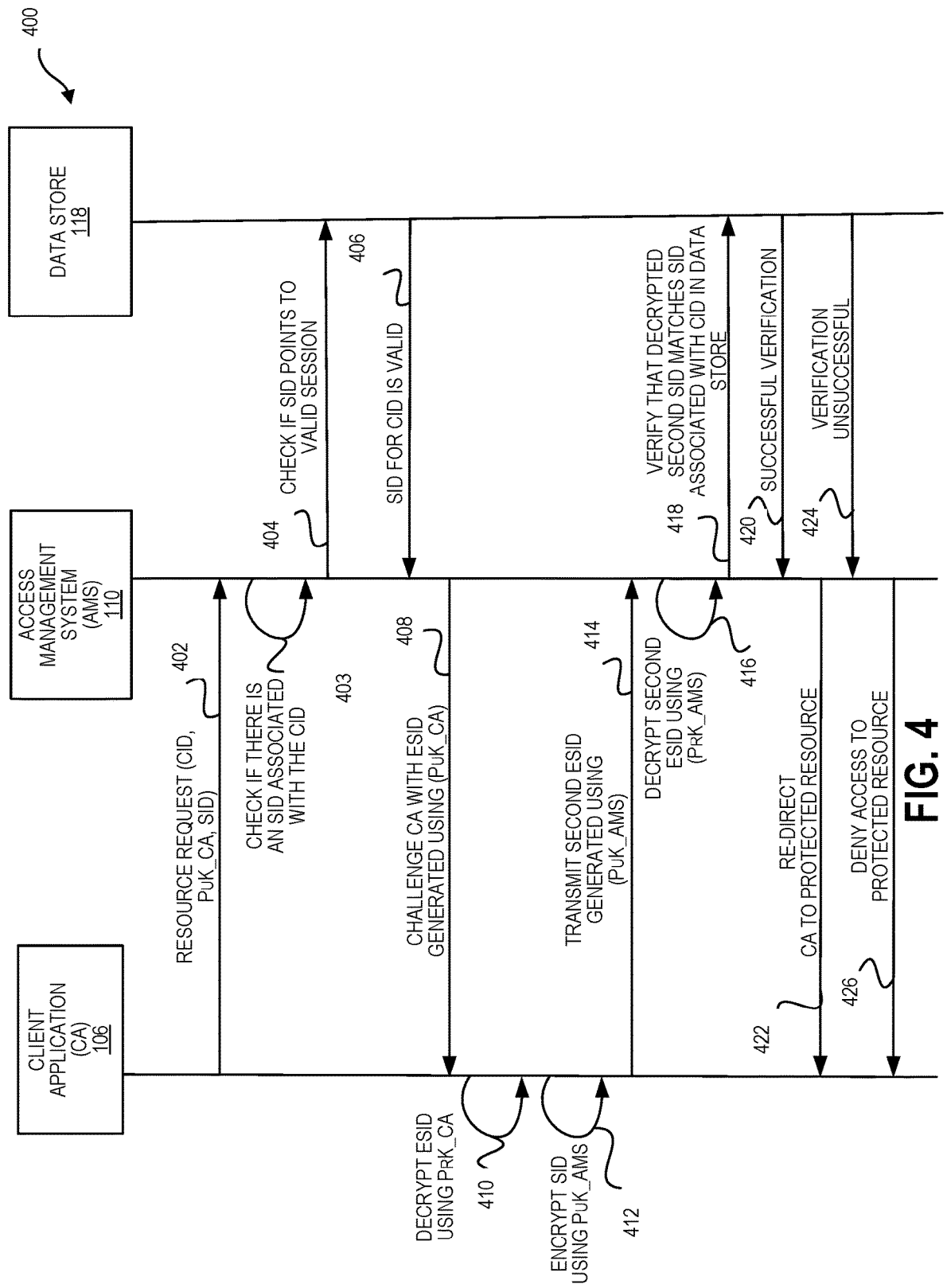
FIG. 4 is a sequence diagram illustrating the interactions between the different systems and subsystems shown in the computing environment of FIG. 1 for enabling a user to access a protected resource using SSO authentication, according to certain embodiments

FIG. 4 is a sequence diagram illustrating the interactions between the different systems and subsystems shown in computing environment 100 of FIG. 1 for enabling a user to access a protected resource using SSO authentication, according to certain embodiments. In certain embodiments, such as in the embodiment depicted in FIG. 4, the SSO authentication may be performed by client application 106 and SSO subsystem 112 as a result of determining that an active and/or valid session exists for a user requesting access to a protected resource stored on target resource system 122. At operation 402, client application (e.g., 106) transmits a request (comprising a URL or other data identifying the requested resource, a client application identifier, a session identifier and a public encryption key) to AMS 110. As discussed in relation to FIGS. 2 and 3, in certain embodiments, the client application identifier and the client public encryption key may be generated by client application 106 upon receiving a request to access a protected resource. At operation 403, AMS 110 receives the request and determines if there is a session identifier associated with the client application identifier received in the request. If the request includes a session identifier, at operation 404, AMS 110 performs another check to determine if the session identifier points to an active and/or valid session by accessing sessions information 120 associated with the particular client application identifier from data store 118. If the session identifier points to an active and/or valid session, at operation 406, AMS 110 receives a message from data store 118 that the session identifier for the client application identifier specified in the request is valid.

Upon determining that an active and/or valid session exists for the client identifier, at operation 408, AMS 110 determines if the resource specified in the request is a protected and SSO-enabled resource. If the resource is a protected and SSO-enabled resource, AMS 110 performs SSO authentication for user 102 to provide the user secure access to the protected resource without prompting the user for credential information. As part of this processing, AMS 110 obtains the encrypted session identifier (that was encrypted using the public encryption key generated by client application 106) stored in data store 118 and associated with the client application identifier specified as part of the request and at operation 408, AMS 110 transmits the encrypted session identifier to client application 106. In certain examples, AMS 110 may present client application 106 with the encrypted session identifier (ESID) in the form of a challenge (e.g., via a UI of the client application). At operation 410, client application 106 decrypts the encrypted session identifier using its private encryption key (PrK_CA)) (stored in secure storage in the client application) to generate a decrypted session identifier.

In certain embodiments, as part of enabling secure communications between client application 106 and AMS 110, AMS 110 may also generate a set of encryption keys (i.e., a private-public encryption key pair) which may be used by and/or made available to client application 106 to establish secure communications with AMS 110. For purposes of this disclosure the private encryption key and the public encryption key generated by AMS 110 are referred to herein using the notations, PrK_AMS and PuK_AMS respectively. For example, upon generating the decrypted session identifier at operation 410, instead of transmitting the decrypted session identifier in plain text format, at operation 412, client application 106 may encrypt the decrypted session identifier (generated at operation 410) with a public encryption of AMS 110 prior to transmitting the session identifier to AMS 110. Accordingly, in certain examples, client application 106 may transmit a second encrypted session identifier (i.e., encrypted by client application 106 using the public key of AMS 110) to AMS 110 at operation 414.

At operation 416, AMS 110 receives the second encrypted session identifier from the client application and decrypts the second encrypted session identifier using its private encryption key. At operation 418, AMS 110 verifies that the decrypted second session identifier matches the session identifier associated with the client application identifier stored in data store 118. At operation 420, data store 118 transmits a message to AMS 110 that the verification was successful. At 422, AMS 110 enables the user to access the protected resource by re-directing the client application to access the protected resource.

In certain embodiments, at operation 418, if the decrypted second session identifier does not match the session identifier associated with the client application identifier, then at operation 424 data store 118 transmits a message to AMS 110 that the verification was unsuccessful. At 426, AMS 110 denies the user access to the protected resource.

Figure 5:
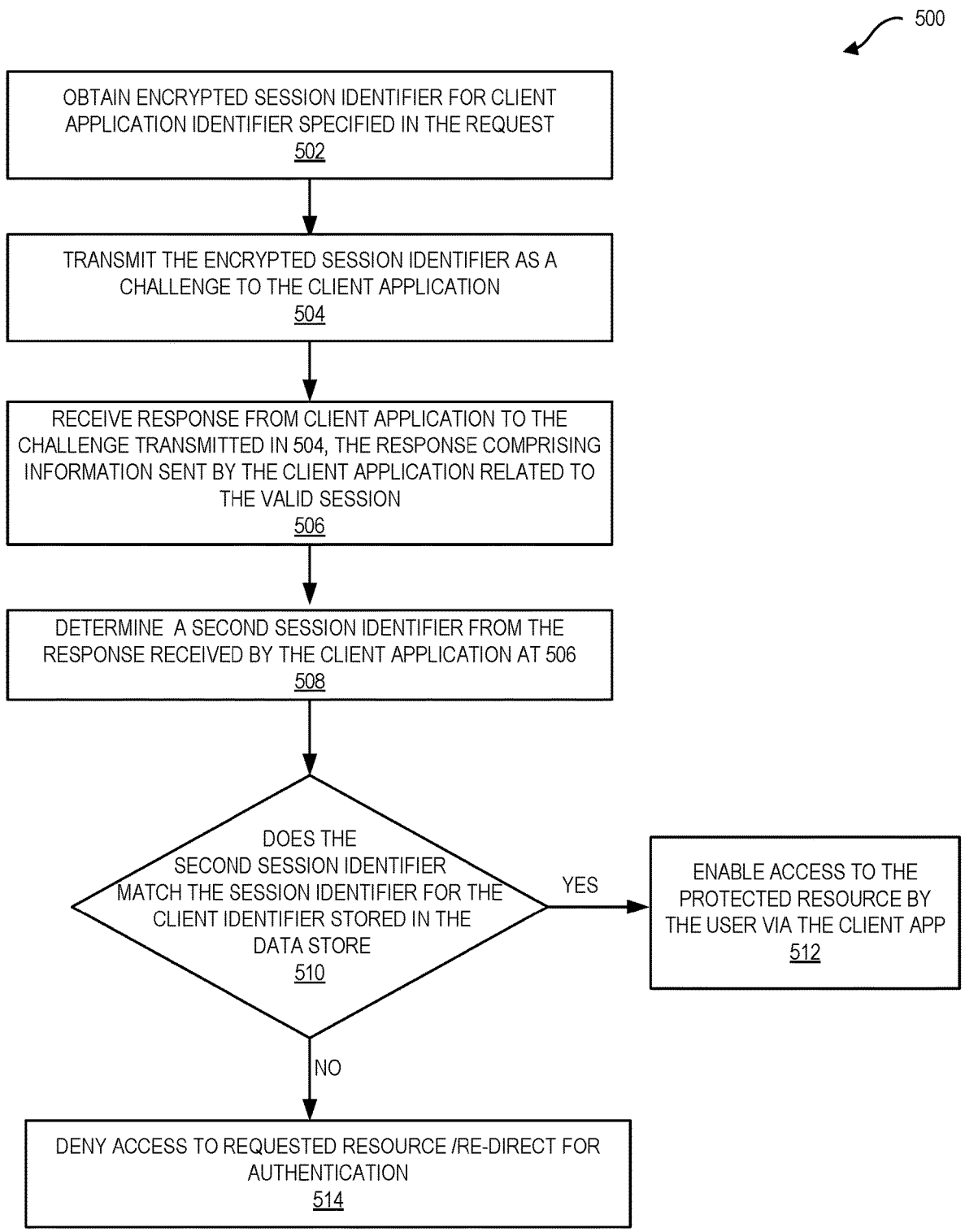
FIG. 5 depicts an example of a process performed by the AMS for providing SSO authentication to enable a user access to a protected resource within the computing environment depicted in FIG. 1, according to certain embodiments.

FIG. 5 depicts an example of a process 500 performed by the AMS for providing SSO authentication to enable a user access to a protected resource within the computing environment depicted in FIG. 1, according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 5 may be performed by AMS 110. In certain embodiments, within AMS 110, the processing in 502-514 in FIG. 5 may be performed by SSO subsystem 112 and session management subsystem 114 depicted in FIG. 1.

In certain embodiments, the processing depicted in FIG. 5 is initiated when session management subsystem 114 determines that an active and/or valid session exists for the client application specified in the request (e.g., as a result of executing step 204 of FIG. 2). For instance, session management subsystem 114 may determine that the session identifier in the request corresponds to a valid (i.e., an active or unexpired) session established by AMS 110 by accessing session data associated with the session identifier stored as part of sessions information 120 for the session stored in data store 118

At block 502, SSO subsystem 112 obtains the encrypted session identifier associated with the valid session for the client application identifier specified in the request from sessions information 120. At block 504, SSO subsystem 112 transmits the encrypted session identifier to client application 106. In certain examples, SSO subsystem 112 may present client application 106 with the encrypted session identifier in the form of a challenge (e.g., via a UI of the client application).

At block 506, SSO subsystem 112 receives a response from client application 106 to the challenge transmitted in block 504. In certain examples, the response comprises information sent by client application 106 related to the valid session. In one example, the information received in the response may comprise a second session identifier generated by client application 106. For instance, as described in FIG. 4, in certain embodiments, the second session identifier may comprise a decrypted session identifier generated by the client application. The decrypted session identifier may be generated by the client application by decrypting the encrypted session identifier received from AMS 110 using a client private encryption key generated by the client application. In other embodiments, the second session identifier may comprise a second encrypted session identifier. The second encrypted session identifier may be generated by the client application by decrypting the encrypted session identifier received from the computer system using the client private encryption key generated by client application and encrypting the decrypted session identifier using a public encryption key associated with AMS 110.

At block 508, AMS 110 determines the second session identifier from the response received from the client application at block 506.

At block 510, AMS 110 performs a check to determine if the second session identifier matches the session identifier for the client identifier stored in data store 118. As noted above, in some embodiments, the second session identifier may comprise a decrypted session identifier generated by the client application. In other embodiments, second session identifier may comprise a second encrypted session identifier generated by the client application.

If AMS 110 determines that the second session identifier matches the session identifier for the client identifier stored in the data store, at block 512, AMS 110 enables the user to access the protected resource via the client application. If AMS 110 determines that the second session identifier does not match the session identifier for the client identifier stored in the data store, at block 514, AMS 110 denies the user access the protected resource. In some examples, at block 514, AMS 110 may re-direct the request to authentication system 116 which may then attempt to re-authenticate the user in order to enable the user to access the protected resource.

The disclosed approach facilitates SSO authentication without requiring the use of specific digital certificates or cookies to be stored on the client application for enabling a user access to multiple protected resources within an enterprise. Since a user's session information is stored on the server (i.e., the access management system) and the client application has the capability to encrypt/decrypt session information sent to it by the access management system, cookie information does not need to be stored on the client application or exchanged with the access management system to enable the user access to the protected resources. This results in increased security provided to services that require storing information about a user's session to enable the user access to multiple protected resources within the enterprise.

Example Implementation

Figure 6:
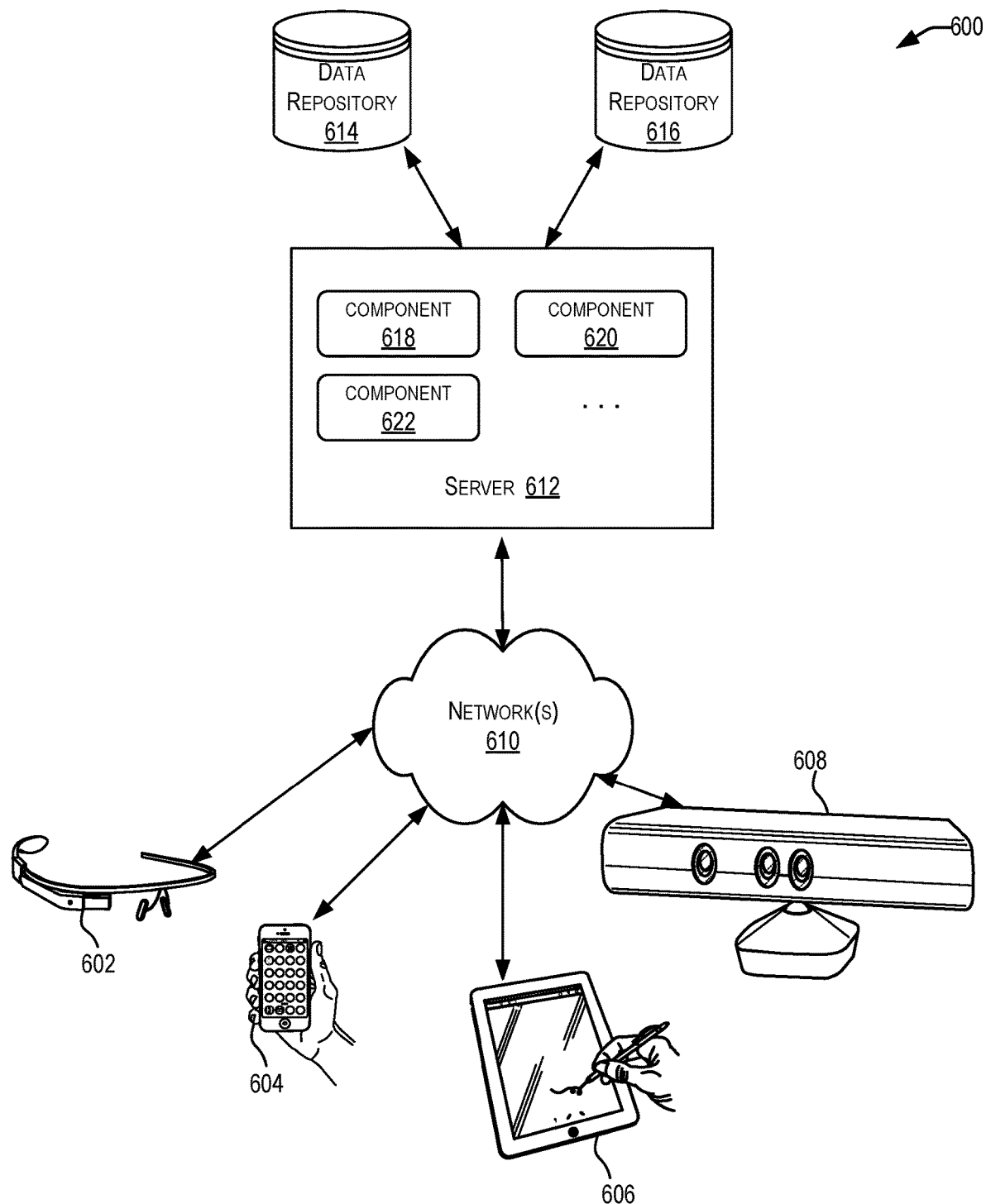
FIG. 6 depicts a simplified diagram of a distributed system for implementing one of the embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the processing described in this disclosure.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with server 612 in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store data or information generated by the processing described herein and/or data or information used for the processing described herein. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
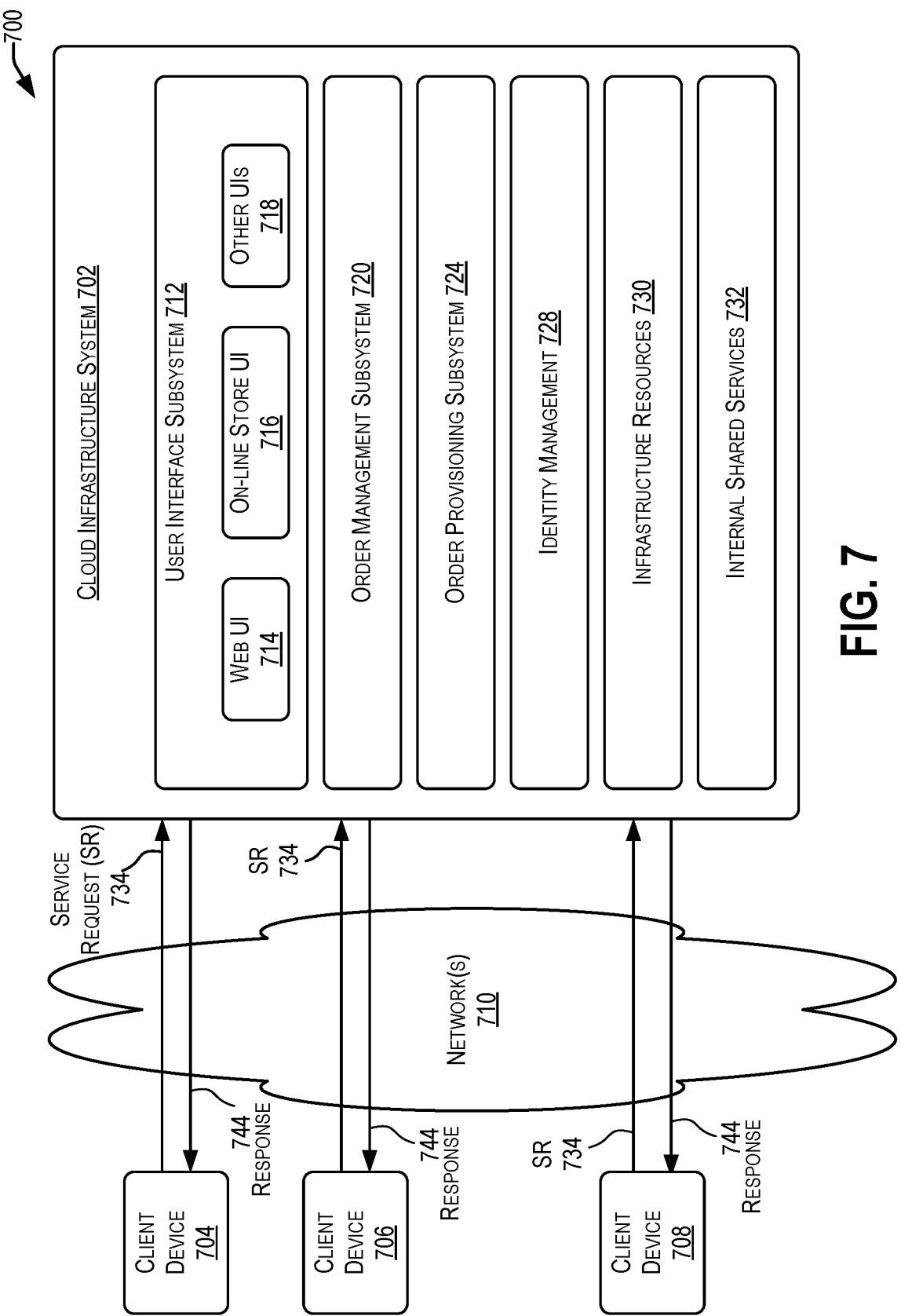
FIG. 7 is a simplified block diagram of a cloud-based system environment in which functionalities described herein may be offered as cloud services, in accordance with certain embodiments.

In certain embodiments, the SSO functionalities described in this disclosure may be offered as services via a cloud environment. FIG. 7 is a simplified block diagram of a cloud-based system environment in which functionalities described herein may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 1) and may be capable of operating one or more client applications. A user may use a client device to interact with cloud infrastructure system 702, such as to request a service provided by cloud infrastructure system 702.

In some embodiments, the processing performed by cloud infrastructure system 702 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 216 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
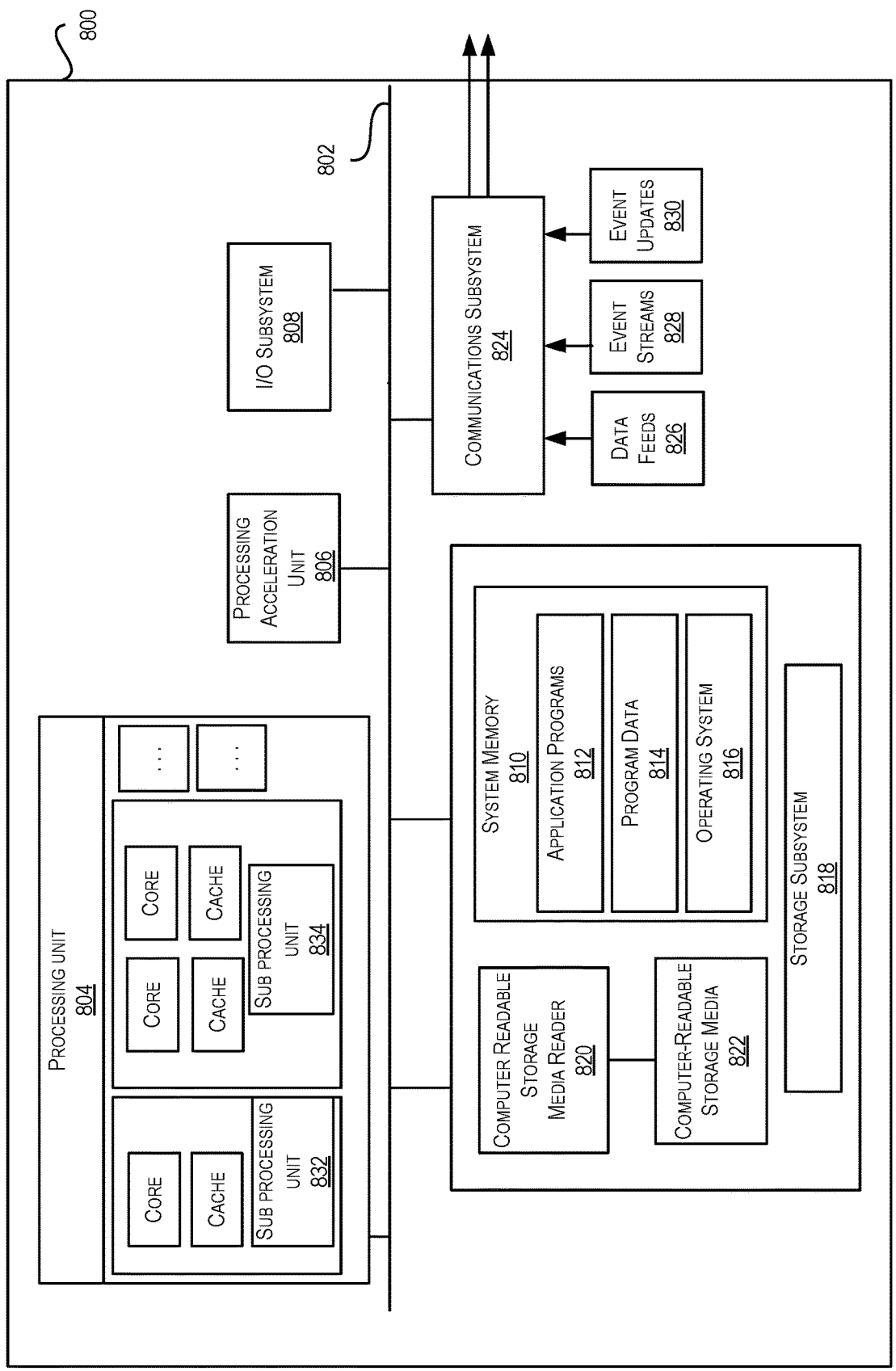
FIG. 8 illustrates an exemplary computer system, in which various embodiments of the present invention may be implemented.

FIG. 8 illustrates an exemplary computer system 800 that may be used to implement certain embodiments. For example, in some embodiments, computer system 800 may be used to implement any of the system and subsystems for performing processing according to the present disclosure. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 860 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computer system, a request from a client application, the request requesting access by a user to a protected resource, the request comprising a client application identifier identifying the client application;
   upon determining, by the computer system, that the client application identifier is associated with a session identifier identifying a valid session for the user, transmitting, by the computer system, an encrypted session identifier to the client application, the encrypted session identifier generated by encrypting the session identifier using a client public encryption key associated with the client application;
   responsive to the transmitting, receiving, by the computer system, a second encrypted session identifier from the client application;
   decrypting, by the computer system, the second encrypted session identifier using a private encryption key generated by the computer system to generate a decrypted second session identifier;
   determining, by the computer system, whether the decrypted second session identifier matches the session identifier associated with the client application identifier; upon determining that the decrypted second session identifier matches the session identifier associated with the client application identifier, enabling, by the computer system, the user to access the protected resource; and
   upon determining that the decrypted second session identifier does not match the session identifier associated with the client application identifier, denying the user access to the protected resource.

2. The method of claim 1, further comprising generating, by the client application, the second encrypted session identifier by:
   decrypting the encrypted session identifier using a private encryption key associated with the client application to generate a decrypted session identifier; and
   encrypting the decrypted session identifier using a public encryption key associated with the computer system to generate the second encrypted session identifier.

3. The method of claim 1, further comprising:
   performing, by the computer system, an authentication of the user to access the protected resource, the authentication performed in response to receiving an initial request from the client application prior to the request and based on determining, by the computer system that the session identifier for the client application identifier specified in the initial request is not valid;
   based upon successful authentication, establishing, by the computer system, a session for the user; and
   enabling, by the computer system, the user to access the protected resource.

4. The method of claim 3, wherein performing, by the computer system, the authentication of the user comprises:
   transmitting, by the computer system, a credential information request to the client application; and
   receiving, by the computer system, credential information associated with the user from the client application.

5. The method of claim 4 wherein performing, by the computer system, the authentication of the user further comprises:
   validating, by the computer system, the credential information against stored credential information associated with the user; and
   based on the validating, performing, by the computer system, the authentication of the user.

6. The method of claim 3, wherein establishing, by the computer system, the session for the user comprises:
   associating, by the computer system, a session identifier with the session;
   encrypting, by the computer system, the session identifier with the client public encryption key to generate the encrypted session identifier; and
   associating, by the computer system, the client application identifier to the session identifier, the encrypted session identifier and session data associated with the session.

7. The method of claim 6, further comprising, storing, by the computer system, the client application identifier, the session identifier, the encrypted session identifier and the session data associated with the session in a data store associated with the computer system.

8. A system comprising:
   a memory storing session data associated with a session; and
   one or more processors configured to perform processing, the processing comprising:
   receiving a request from a client application, the request requesting access by a user to a protected resource, the request comprising a client application identifier identifying the client application;
   upon determining that the client application identifier is associated with a session identifier identifying a valid session for the user, transmitting an encrypted session identifier to the client application, the encrypted session identifier generated by encrypting the session identifier using a client public encryption key associated with the client application;
   responsive to the transmitting, receiving a second encrypted session identifier from the client application;
   decrypting the second encrypted session identifier using a private encryption key generated by the computer system to generate a decrypted second session identifier;
   determining whether the decrypted second session identifier matches the session identifier associated with the client application identifier;
   upon determining that the decrypted second session identifier matches the session identifier associated with the client application identifier, enabling the user to access the protected resource; and
   upon determining that the decrypted second session identifier does not match the session identifier associated with the client application identifier, denying the user access to the protected resource.

9. The system of claim 8, further comprising generating, by the client application, the second encrypted session identifier by:
   decrypting the encrypted session identifier using a private encryption key associated with the client application to generate a decrypted session identifier; and
   encrypting the decrypted session identifier using a public encryption key associated with the computer system to generate the second encrypted session identifier.

10. The system of claim 8, wherein the processing further comprises:
   performing an authentication of the user to access the protected resource, the authentication performed in response to receiving an initial request from the client application prior to the request and based on determining that the session identifier for the client application identifier specified in the initial request is not valid;
   based upon successful authentication, establishing a session for the user; and
   enabling the user to access the protected resource.

11. The system of claim 10, wherein the processing to establish the session for the user further comprises:
   associating a session identifier with the session;
   encrypting the session identifier with the client public encryption key to generated the encrypted session identifier; and
   associating the client application identifier to the session identifier, the encrypted session identifier and session data associated with the session.

12. The system of claim 11, further comprising, storing the client application identifier, the session identifier, the encrypted session identifier and the session data associated with the session in a data store associated with the system.

13. A non-transitory computer-readable medium having program code that is stored thereon, the program code executable by one or more processing devices for performing operations comprising:
   receiving a request from a client application, the request requesting access by a user to a protected resource, the request comprising a client application identifier identifying the client application;
   upon determining that the client application identifier is associated with a session identifier identifying a valid session for the user, transmitting an encrypted session identifier to the client application, the encrypted session identifier generated by encrypting the session identifier using a client public encryption key associated with the client application;
   responsive to the transmitting, receiving a second encrypted session identifier from the client application;
   decrypting the second encrypted session identifier using a private encryption key generated by the computer system to generate a decrypted second session identifier;
   determining whether the decrypted second session identifier matches the session identifier associated with the client application identifier;
   upon determining that the decrypted second session identifier matches the session identifier associated with the client application identifier, enabling the user to access the protected resource; and
   upon determining that the decrypted second session identifier does not match the session identifier associated with the client application identifier, denying the user access to the protected resource.

14. The non-transitory computer-readable medium of claim 13, further comprising generating, by the client application, the second encrypted session identifier by:
   decrypting the encrypted session identifier using a private encryption key associated with the client application to generate a decrypted session identifier; and
   encrypting the decrypted session identifier using a public encryption key associated with the computer system to generate the second encrypted session identifier.

* * * * *

UNITED STATES PATENT AND TRADEMARK OFFICE
CERTIFICATE OF CORRECTION

PATENT NO. : 11,750,590 B2  
APPLICATION NO. : 17/666508  
DATED : September 5, 2023  
INVENTOR(S) : Pattar et al.

Page 1 of 1

It is certified that error appears in the above-identified patent and that said Letters Patent is hereby corrected as shown below:

In the Specification

In Column 4, Line 7, delete "embodiments" and insert -- embodiments. --, therefor.

In Column 12, Line 65, delete "118" and insert -- 118. --, therefor.

In Column 21, Line 28, delete "(e.g., Google) Glass®)." and insert -- (e.g., Google Glass®). --, therefor.

In Column 23, Line 41, delete "evolution)," and insert -- evolution)), --, therefor.

Signed and Sealed this  
Eighteenth Day of June, 2024

Katherine Kelly Vidal  
*Director of the United States Patent and Trademark Office*